US012270228B2

(12) United States Patent
Jensen

(10) Patent No.: US 12,270,228 B2
(45) Date of Patent: Apr. 8, 2025

(54) CATCH MECHANISM FOR A LOCKING DEVICE

(71) Applicant: STENDALS EL AB, Västerås (SE)

(72) Inventor: Lars Jensen, Surahammar (SE)

(73) Assignee: STENDALS EL AB, Västerås (SE)

( * ) Notice: Subject to any disclaimer, the term of this patent is extended or adjusted under 35 U.S.C. 154(b) by 464 days.

(21) Appl. No.: 17/610,307

(22) PCT Filed: May 14, 2020

(86) PCT No.: PCT/SE2020/050500
§ 371 (c)(1),
(2) Date: Nov. 10, 2021

(87) PCT Pub. No.: WO2020/236069
PCT Pub. Date: Nov. 26, 2020

(65) Prior Publication Data
US 2022/0243498 A1 Aug. 4, 2022

(30) Foreign Application Priority Data
May 17, 2019 (SE) .................................... 1950590-8

(51) Int. Cl.
*E05B 17/20* (2006.01)
*E05B 15/00* (2006.01)
(Continued)

(52) U.S. Cl.
CPC ........ *E05B 17/2034* (2013.01); *E05B 15/004* (2013.01); *E05B 47/0012* (2013.01); *E05B 47/023* (2013.01); *E05B 47/0607* (2013.01)

(58) Field of Classification Search
CPC ............... E05B 17/2007; E05B 17/203; E05B 17/2034; E05B 17/2019; E05B 17/20;
(Continued)

(56) References Cited

U.S. PATENT DOCUMENTS 2,447,190 A 8/1948 Lickteig
2,645,926 A 7/1953 Erkkil
(Continued)

FOREIGN PATENT DOCUMENTS

DE 202008013405 U1 1/2009
DE 102008016699 A1 10/2009
(Continued)

OTHER PUBLICATIONS

Annotated machine translation of EP 3372757 A1 (Year: 2018).*
Opposition filed against Swedish patent No. 543487 on Jul. 10, 2023.

*Primary Examiner* — Gilbert Y Lee
*Assistant Examiner* — Peter H Watson
(74) *Attorney, Agent, or Firm* — Dilworth & Barrese, LLP.

(57) ABSTRACT

The present invention relates to a catch mechanism for blocking a bolt to prevent unauthorized opening of a door, the catch mechanism comprising a follower for operating a bolt between a locked state in which the bolt is extended and an unlocked state in which the bolt is retracted; a catch configured to block the follower for preventing movement of the bolt in the locked state, and a control member for operating the follower and the catch, The invention also relates to a locking device comprising such a catch mechanism.

7 Claims, 11 Drawing Sheets

Figure 1:
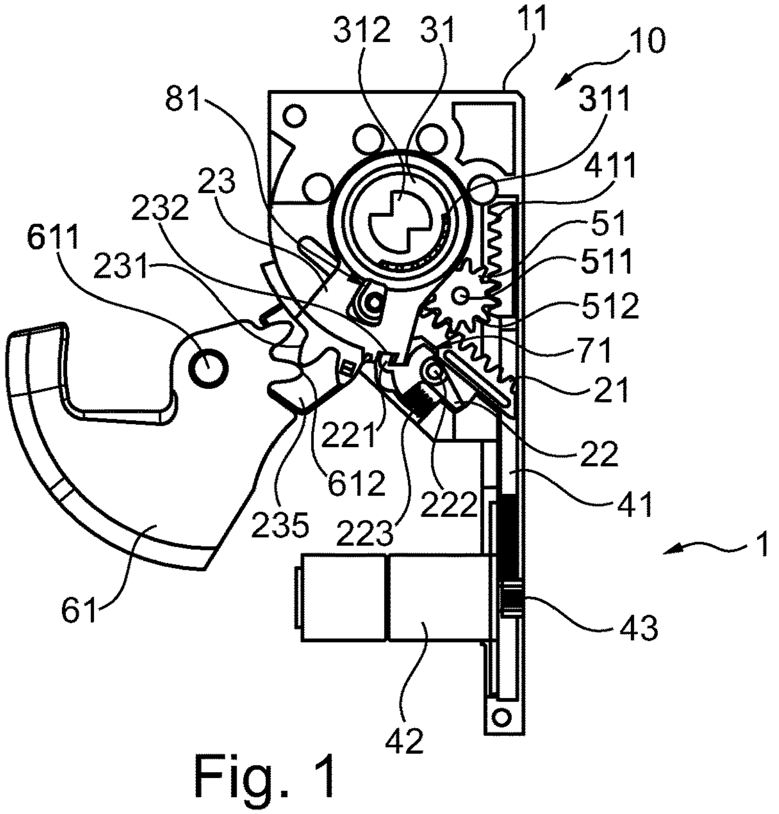

(51) Int. Cl.
*E05B 47/00* (2006.01)
*E05B 47/02* (2006.01)
*E05B 47/06* (2006.01)

(58) Field of Classification Search
CPC ............. E05B 17/2049; E05B 17/2038; E05B 17/2053; E05B 17/2057; E05B 15/004; E05B 47/0012; E05B 47/023; E05B 47/026; E05B 47/0603; E05B 2047/002; E05B 2047/0016; E05B 2047/0084; E05B 2047/0085; E05C 3/004
See application file for complete search history.

(56) References Cited

U.S. PATENT DOCUMENTS

| | | | | |
|---|---|---|---|---|
| 4,685,709 | A * | 8/1987 | Kambic | E05B 47/0012 292/201 |
| 4,843,851 | A | 7/1989 | Frolov | |
| 5,083,448 | A | 1/1992 | Kaerkkaeinen et al. | |
| 5,148,691 | A * | 9/1992 | Wallden | E05B 47/0012 292/201 |
| 2005/0172685 | A1 | 8/2005 | Keightly | |
| 2006/0144102 | A1 | 7/2006 | Keightley | |
| 2008/0190155 | A1 | 8/2008 | Kim | |
| 2009/0277231 | A1* | 11/2009 | Kim | E05B 63/0013 70/336 |
| 2011/0036131 | A1 | 2/2011 | Chiou et al. | |
| 2011/0037278 | A1 | 2/2011 | Dynes et al. | |
| 2012/0000257 | A1* | 1/2012 | Wheeler | E05C 9/042 70/91 |
| 2012/0292925 | A1 | 11/2012 | Lundberg et al. | |
| 2013/0192316 | A1 | 8/2013 | Mckibben et al. | |
| 2013/0298617 | A1 | 11/2013 | Lambrou et al. | |
| 2017/0247912 | A1 | 8/2017 | Ando | |
| 2017/0321453 | A1 | 11/2017 | Zheng et al. | |

FOREIGN PATENT DOCUMENTS

| | | | | |
|---|---|---|---|---|
| EP | 0482588 | A1 | 4/1992 | |
| EP | 0537531 | A1 | 4/1993 | |
| EP | 1213425 | A1 | 6/2002 | |
| EP | 1353028 | A1 | 10/2003 | |
| EP | 1464781 | A2 | 10/2004 | |
| EP | 1921233 | A1 | 5/2008 | |
| EP | 2 378 039 | A2 | 10/2011 | |
| EP | 2873790 | A1 * | 5/2015 | E05B 15/10 |
| EP | 3372757 | A1 | 9/2018 | |
| FR | 1355736 | A | 3/1964 | |
| SE | 440529 | B | 8/1985 | |
| SE | 463979 | B | 2/1991 | |
| SE | 533 873 | C2 | 2/2011 | |
| SE | 540893 | C2 | 10/2017 | |
| WO | 2012126039 | A1 | 9/2012 | |

* cited by examiner

CATCH MECHANISM FOR A LOCKING DEVICE

TECHNICAL FIELD

The present invention relates to a catch mechanism for blocking a bolt to prevent unauthorized opening of a door by providing a control member or a control mechanism that operates a catch and a follower in turn. Operation of the follower is prevented when the catch is in a locking position.

BACKGROUND

Locking devices are used for allowing authorized persons to pass through a door while preventing other persons from doing so. The methods of operating a lock are either purely mechanical (i.e. turning a key in a lock) or dependent on an electrical or electromechanical activation, for instance by providing a keycard or tag that is recognized by the locking device.

The problem of unauthorized persons attempting to pass through locked doors is commonly solved by making the locking device itself more difficult to manipulate. In many prior art solutions, a catch is provided that prevents a bolt from retracting and unlocking a door unless the catch is first removed by activating the lock in an authorized manner.

However, many locking devices are indeed possible to activate by forcing the catch to release the bolt, either by using violence against the lock or by using tools to enter the lock through the opening provided for the bolt itself in order to manipulate the catch.

Although some solutions do exist to this problem, they are not satisfactory and are not able to eliminate the risk of unauthorized entry. There is therefore a need for improvements within this area.

SUMMARY

The object of the present invention is to eliminate or at least to minimize the problems discussed above. This is achieved by a catch mechanism according to any of the appended independent claims and by a locking device comprising such a catch mechanism. The present invention is also directed to a locking device that comprises a catch mechanism according to a first aspect or a catch mechanism according to a second aspect described below.

The catch mechanism according to the first aspect of the invention comprises a follower for operating a bolt between a locked state in which the bolt is extended and an unlocked state in which the bolt is retracted; a catch configured to block the follower for preventing movement of the bolt in the locked state; and a control member for operating the follower and the catch. The catch mechanism further comprises a first connector for connecting the control member to the catch and operating the catch, and a second connector for connecting the control member to the follower and operating the follower during movement of the control member along a path. Furthermore, the second connector comprises a play so that the control member at a first portion of the path operates only the catch for moving from a locking position to an open position for unblocking the follower, and so that the control member at a second portion of said path operates the follower for moving the bolt from the locked state to the unlocked state.

The catch that serves to block the follower is not accessible to outside manipulation and cannot be moved from its locking position to the open position in any other way than those provided by authorized persons with mechanical or electronic keys that are able to operate the control member. The catch mechanism can be operated both by mechanical means (i.e. a key inserted into a cylinder and rotated there) and by electromechanical means (i.e. by a motor activated by use of a keycard, tag or similar that is recognized as electronic key wherein the motor upon activation operates mechanical components of the catch mechanism). It is highly advantageous to be able to provide both mechanical operation and electromechanical operation of the catch mechanism, allowing both for the convenient use of keycards or tags and the robust and secure use of mechanical keys that can operate the catch mechanism also without requiring electrical power.

Suitably, at least the catch and the control member may be arranged in an inner housing. Thereby, attempted manipulation of the catch and control member is further prevented.

The catch may be biased towards the follower and the control member may operate the catch by pushing it against the bias by means of the first connector. This makes the catch mechanism highly reliable since the bias will always strive to hold the catch in the locking position.

The first connector may comprise a first contact surface on the control member and a second contact surface on the catch, one of said first and second contact surface being an inclined surface that is preferably arranged at a first angle to the path or a curved surface, and the catch may be biased towards the control member so that a movement of the control member along the path in the first direction pushes the catch against the bias from the locking position to the open position. Thereby, the movement of the control member will make the catch slide in a controlled movement to the open position and be held there by the second contact surface abutting the control member.

Suitably, the follower may be integrally formed with a bolt. In other embodiments, the follower and bolt may be connected in any suitable way so that the follower controls movement and position of the bolt to move from the locked state to the unlocked state and back as desired.

The catch may further comprise a hook and the follower may comprise a cavity for housing the hook in the locking position, and suitably the first connector of the control member may be configured to move the hook from the cavity at the first portion of the path. By the hook being inserted into the cavity, the follower is efficiently prevented from moving. As the hook is moved out of the cavity by the control member operating the catch, the follower is released and may be operated in the second portion of the path of the control member.

Suitably, the follower may comprise a guide surface adjacent to the cavity for guiding the hook towards the cavity when the control member moves along the path in a second direction that is opposite to the first direction. This allows for the hook being guided back towards the cavity when moving from the open position to the locking position, thereby ensuring that the hook safely proceeds towards the cavity and does not risk getting stuck or misguided so that the locking position cannot be achieved.

The second connector may comprise an opening and a protrusion extending into the opening, the opening having a diameter that is larger than a diameter of the protrusion so that a play is formed in which the protrusion is able to move without contacting a wall of the opening. One of the opening and the protrusion may be arranged on the control member and the other may be arranged on the follower. The play enables the control member to move the catch to the open position before a movement of the follower begins, so that the operation of the catch mechanism can proceed smoothly.

The control member may be operated by a motor for moving along the path in a first direction or a second direction. The movement between the locked state and the unlocked state may thus be controlled by the motor without further actions needed, from a person using the lock after the electronic key has been used to activate the motor.

Suitably, the catch mechanism further comprises a cylinder that is operatively connected to the control member for transferring a movement from the cylinder to the control member. This allows for a mechanical operation of the catch mechanism by the cylinder being rotated by a user, typically by inserting a key into a cylinder and turning it in one direction for moving to the unlocked state and the other direction for moving to the locked state. In some embodiments, the cylinder may be a 360° cylinder where a key may be rotated an entire revolution but in other embodiments a 90° cylinder may be used instead where the key is turned one quarter of a revolution and then back to its original position in order to lock or unlock. Other types of cylinders may also be used with the present invention.

In a second aspect of the invention, another catch mechanism is provided. This catch mechanism comprises a follower for operating a bolt between a locked state in which the bolt is extended and an unlocked state in which the bolt is retracted; a catch configured to block the follower for preventing movement of the bolt in the locked state; a control mechanism for operating the follower and the catch, the control mechanism comprising a first member that is rotatably arranged and a second member that is rotatably arranged, the first and second member being operatively connected to each other so that a rotation of one of the first member and second member results in a rotation of the other one of said first member and second member, and also comprising a first connector for connecting the first member to the catch and operating the catch during a rotary movement of the first member, and a second connector for connecting the second member to the follower and operating the follower during a rotary movement of the second member. The second connector comprises a play so that the control mechanism during a first portion of a rotary movement operates only the catch and during a second portion of a rotary movement operates the follower.

The catch mechanism of the second aspect differs from the catch mechanism of the first aspect mainly in the control member of the first aspect instead being a control mechanism that comprises a first and second member where the first member controls operation of the catch and the second member controls operation of the follower. The first and second members are interconnected so that a movement of one will result in a corresponding movement of the other.

Thus, even though the control mechanism differs from the control member of the first aspect, the catch mechanisms of the first and second aspect are similar in many other ways and aim to solve the same underlying problem of operating a catch mechanism at a first part of a movement or path and a follower at a second part of a movement or path. The second connector that connects the follower to the control member or control mechanism comprises a play that enables this to take place.

The features described above with regard to the first aspect of the catch mechanism and the corresponding advantages and benefits achieved by them also apply to the second aspect described herein.

The catch mechanism of the second aspect of the invention may suitably have a first member and a second member that are toothed wheels that are operatively connected to each other by teeth of the first member engaging with teeth of the second member. Thereby, any movement of one of the first and second members will invariably be transmitted to the other.

The first member of the control mechanism may be operated by a motor for rotating about a first pivot. The second member may be operated by a cylinder that is operatively connected to it so that a rotation of a cylinder caused by a key being turned in the cylinder is transferred to the second member. Suitably, the second member pivots on the same pivot as the cylinder itself.

Many additional benefits and advantages of the present invention will be readily understood by the skilled person in view of the detailed description below.

DRAWINGS

Figure 2:
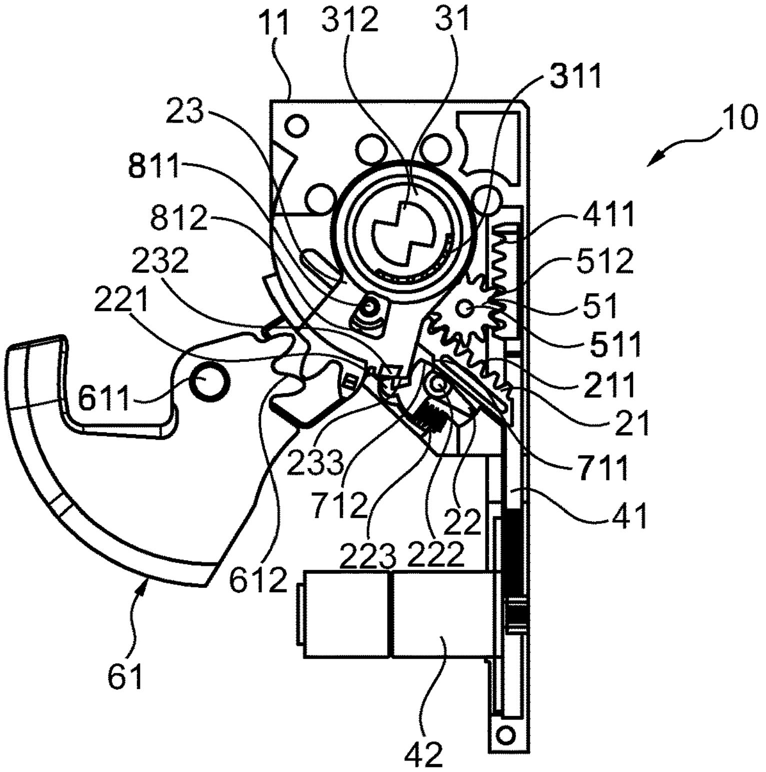
Figure 3:
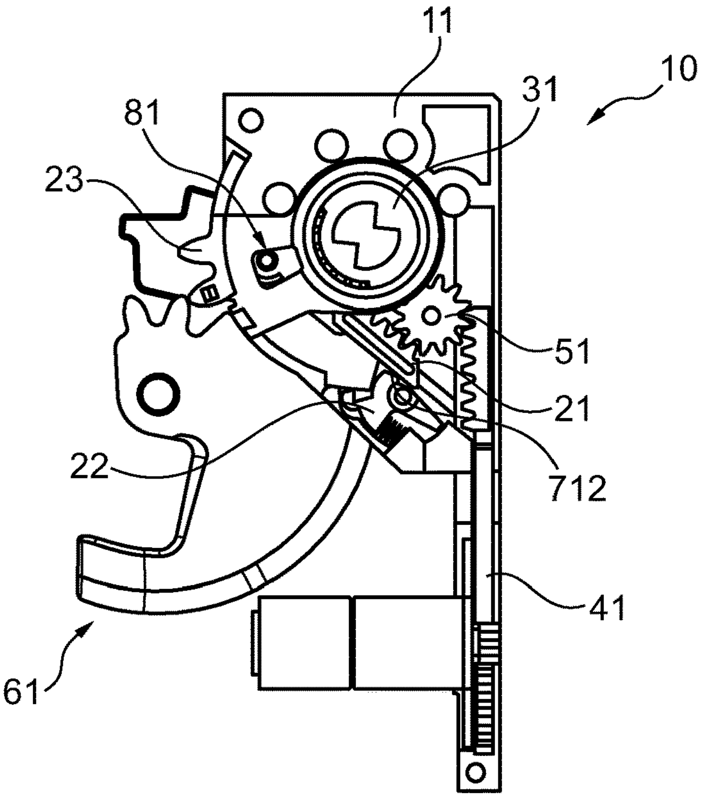
Figure 4:
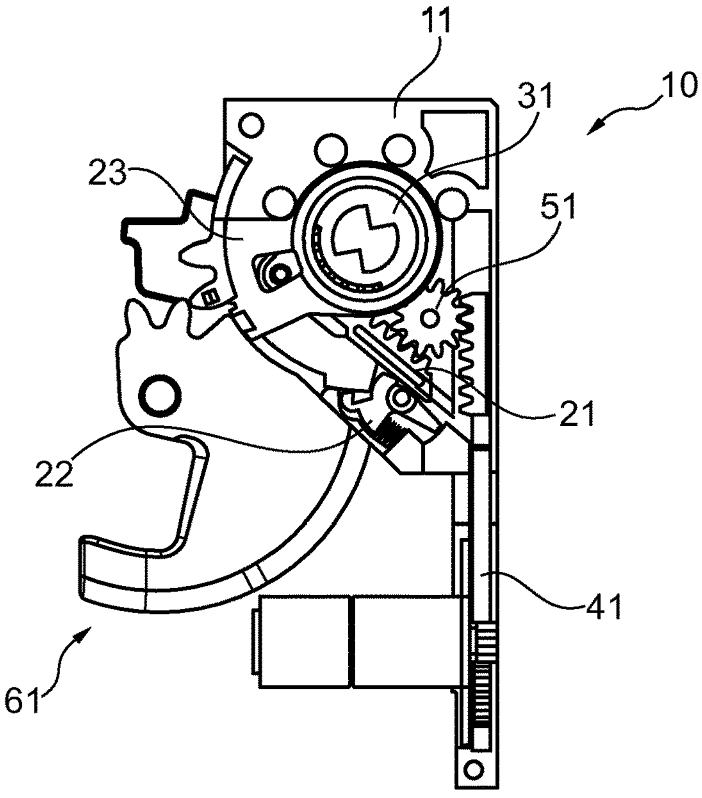
Figure 5:
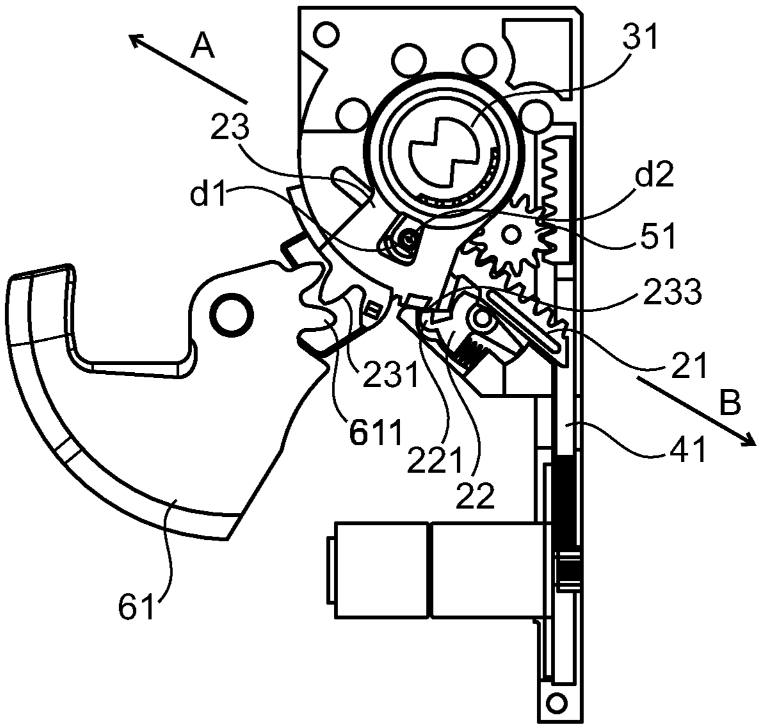
Figure 6:
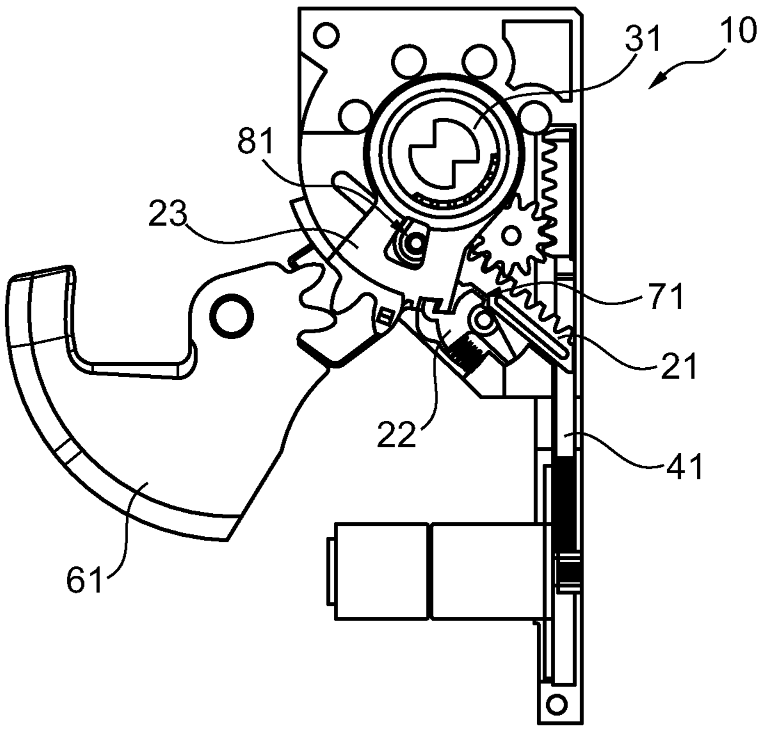
Figure 7:
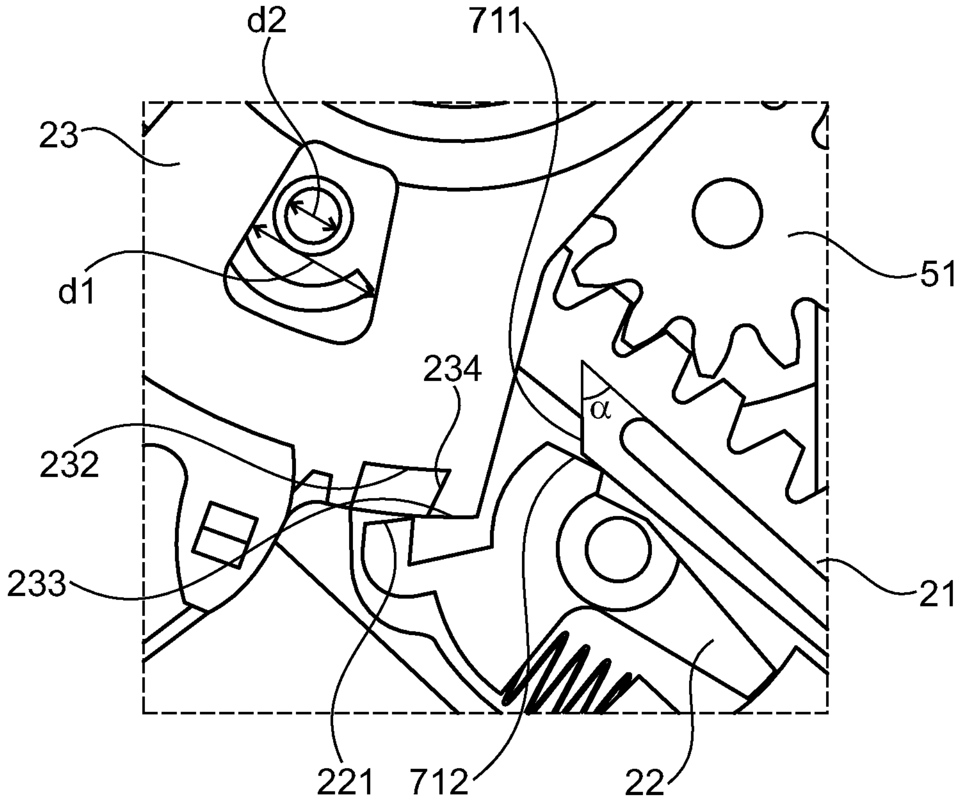
Figure 8:
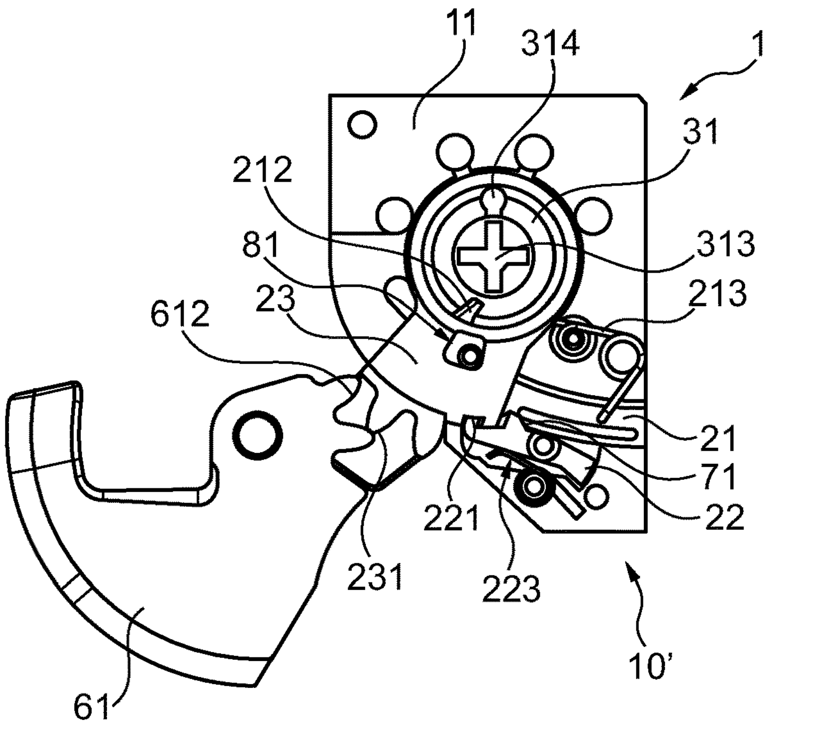
Figure 9:
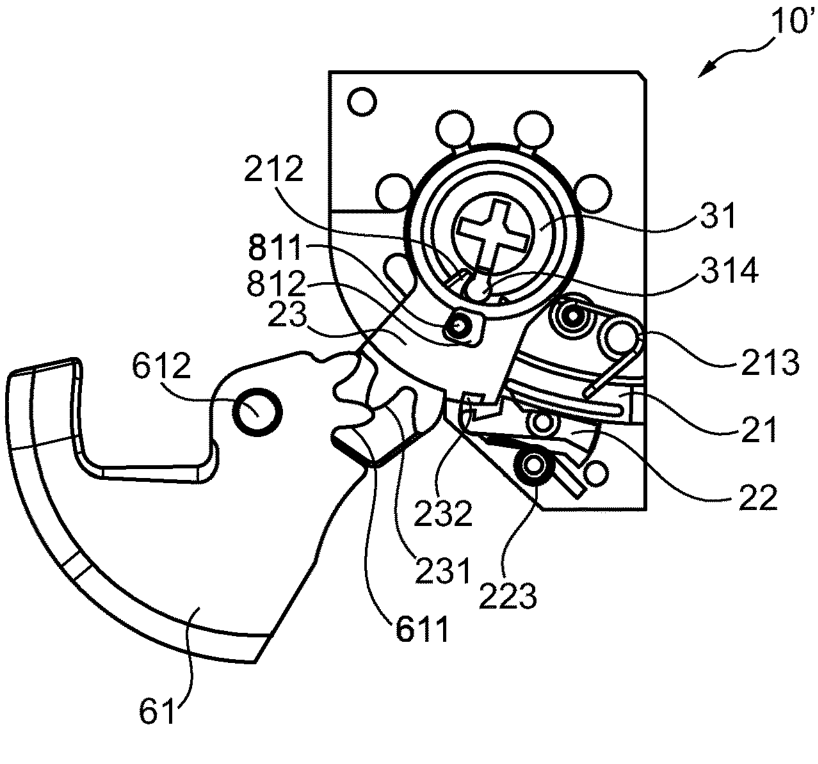
Figure 10:
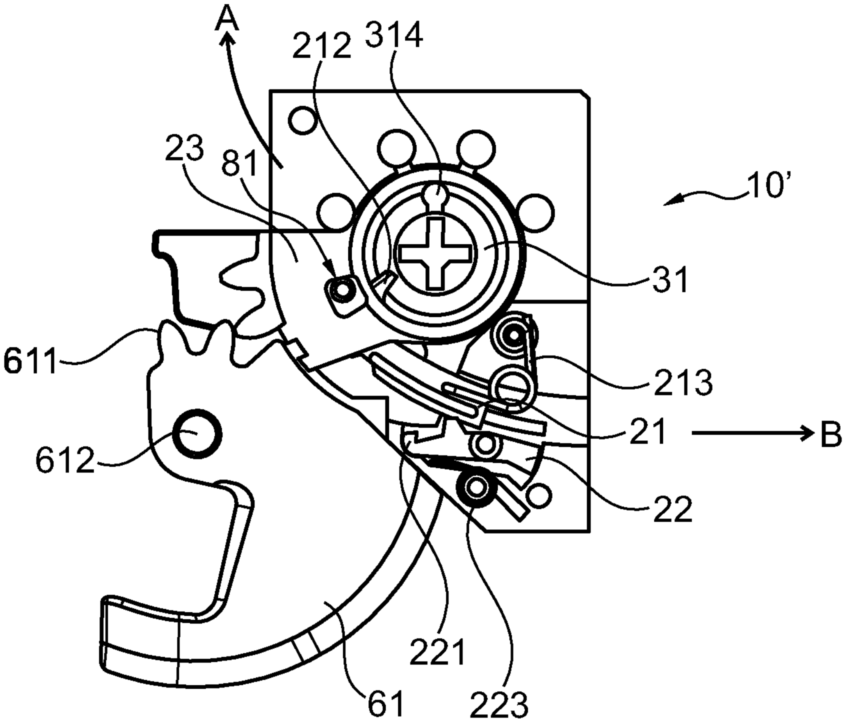
Figure 11:
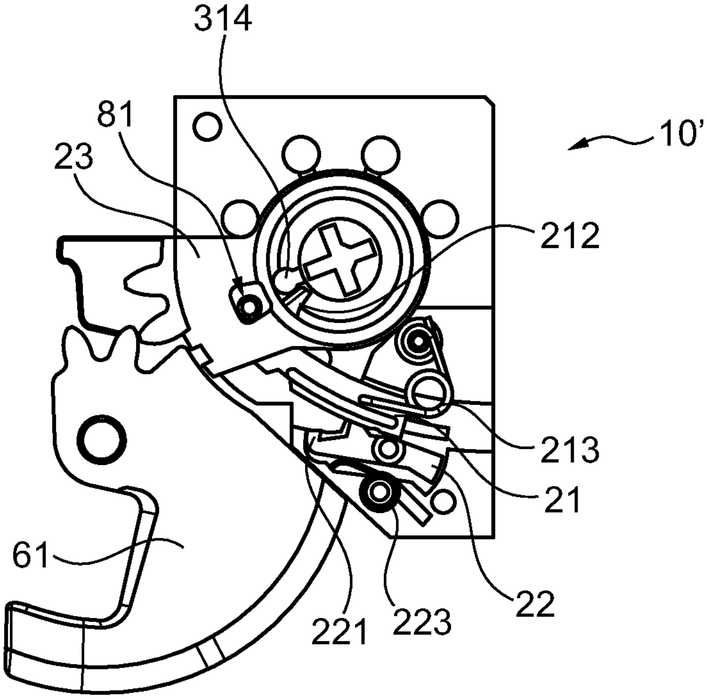
Figure 12:
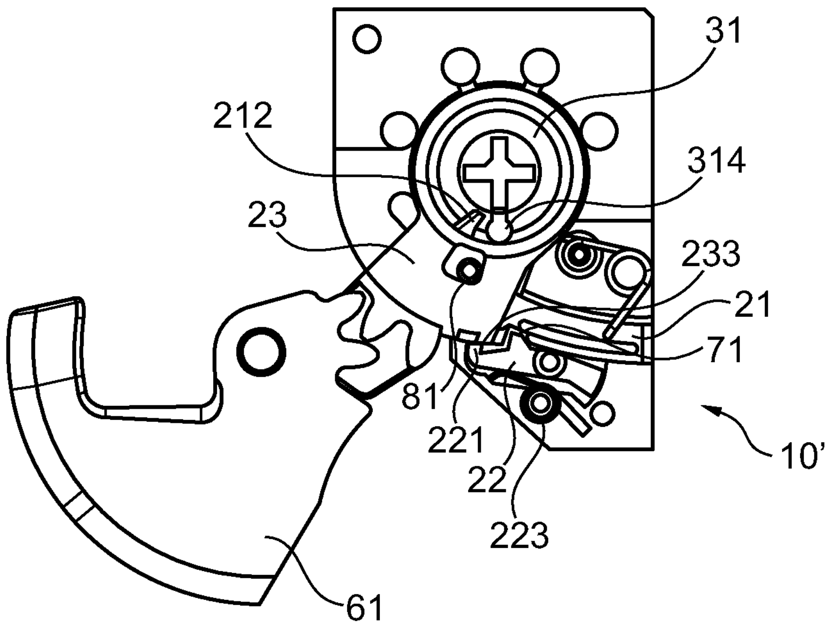
Figure 13:
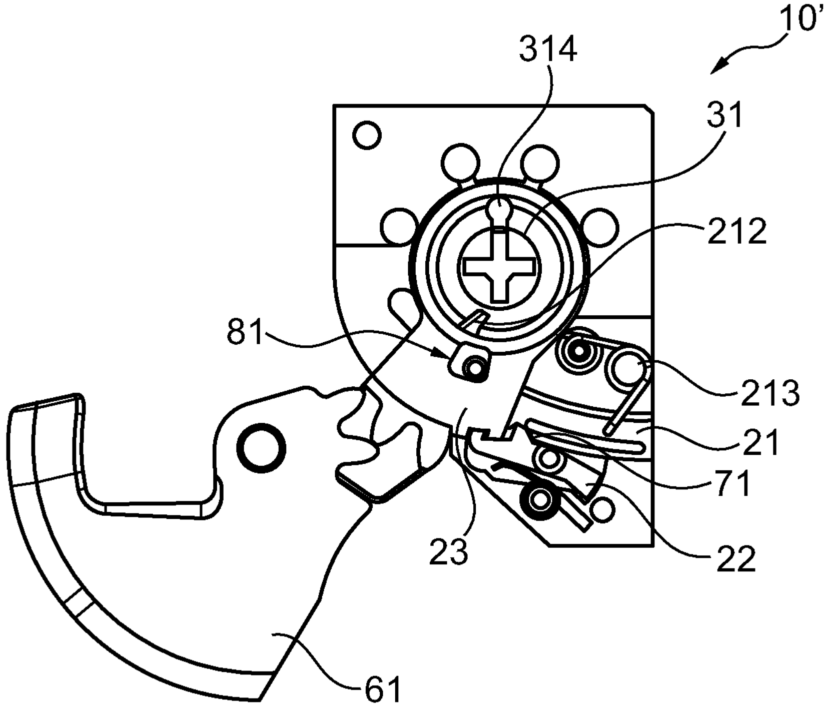
Figure 14:
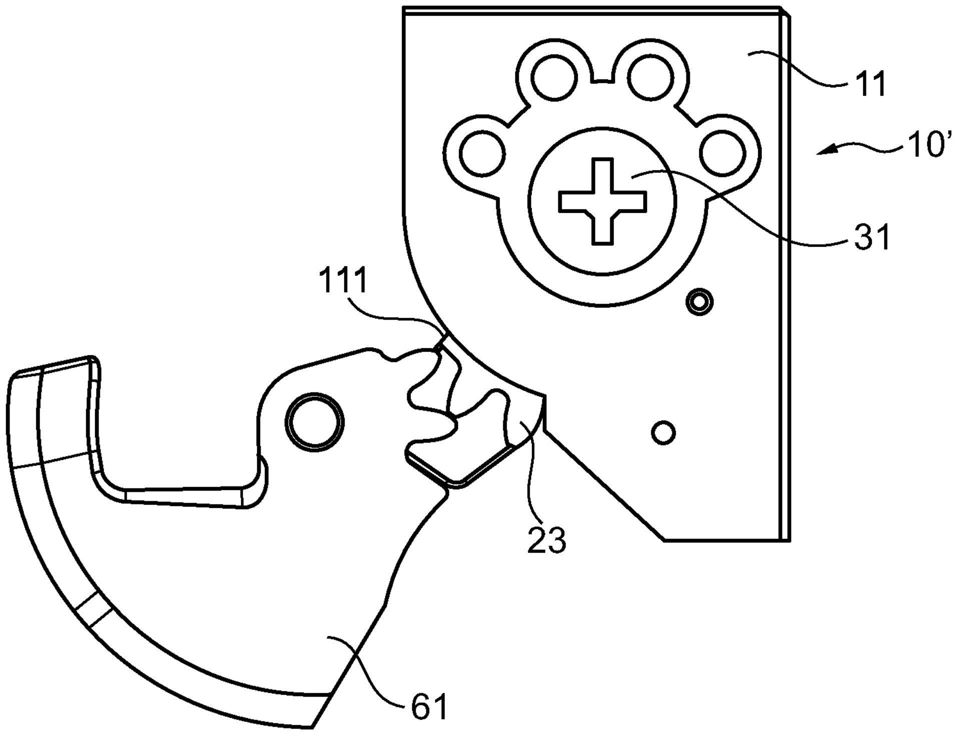
Figure 15:
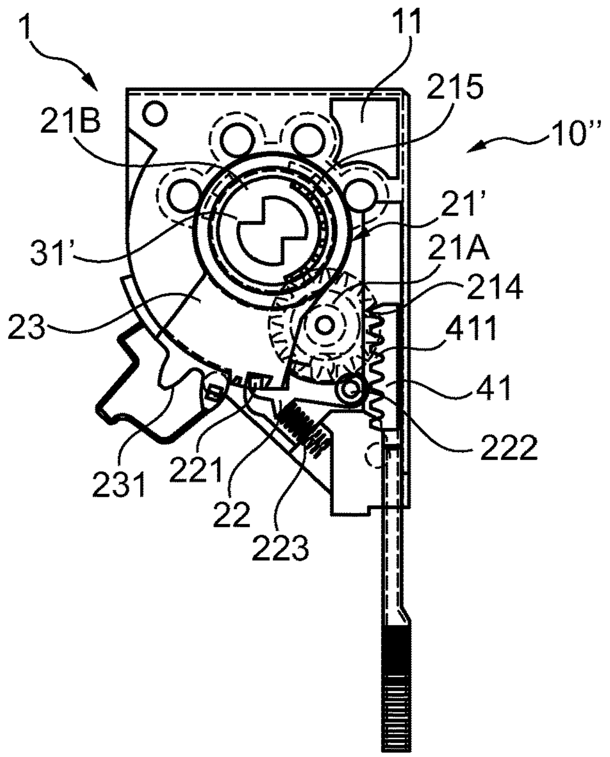
Figure 16:
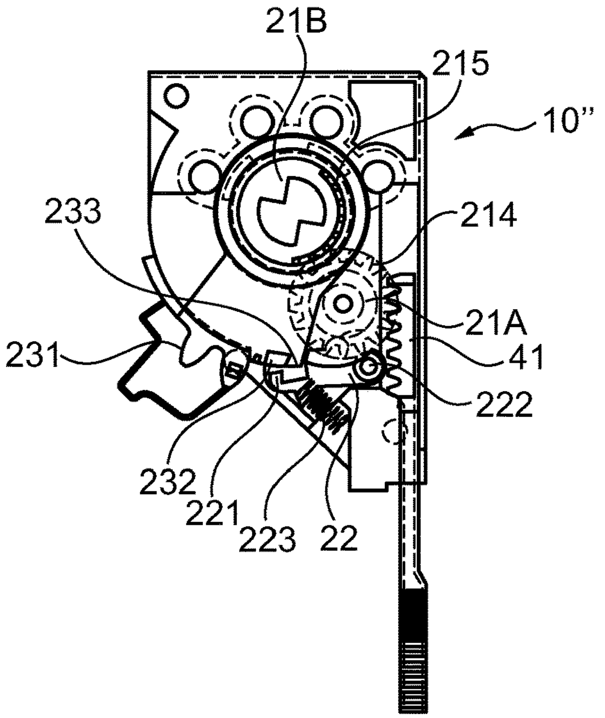
Figure 17:
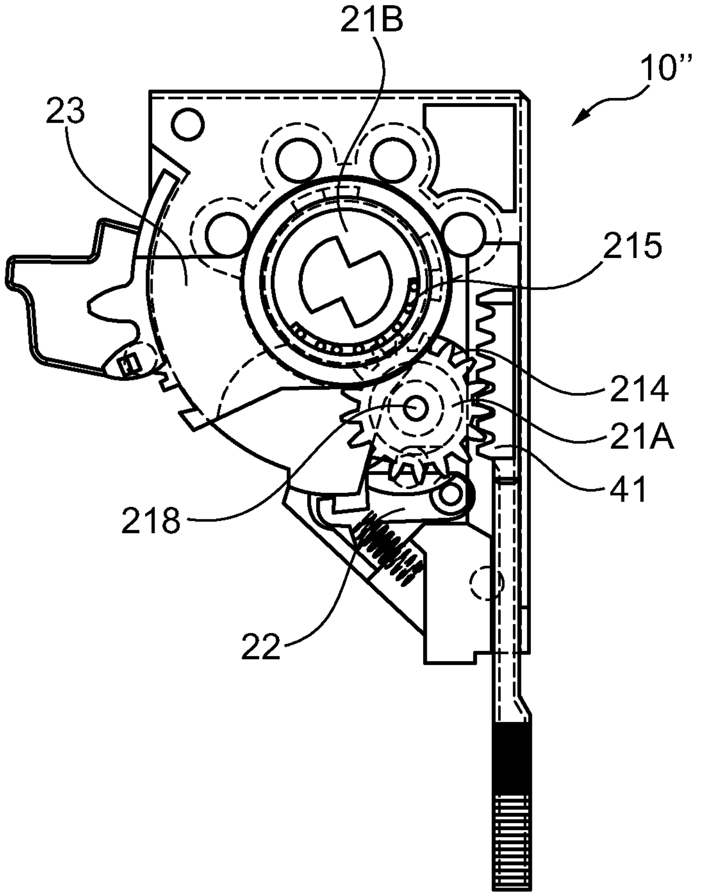
Figure 18:
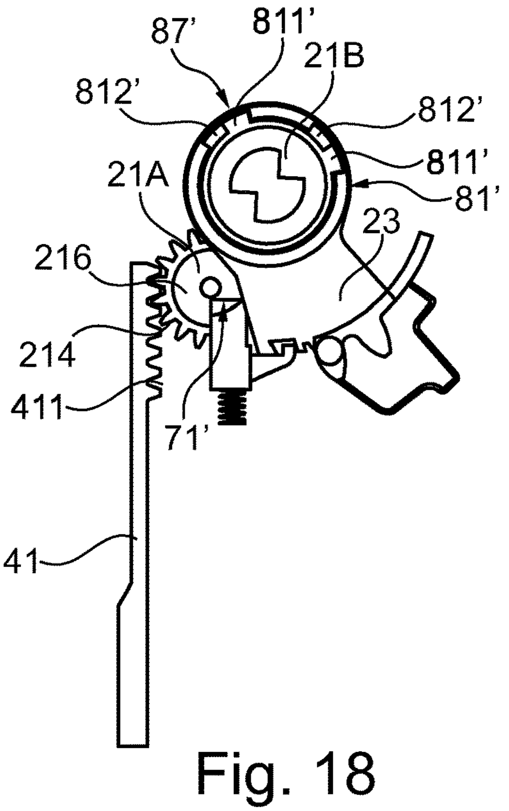
Figure 19:
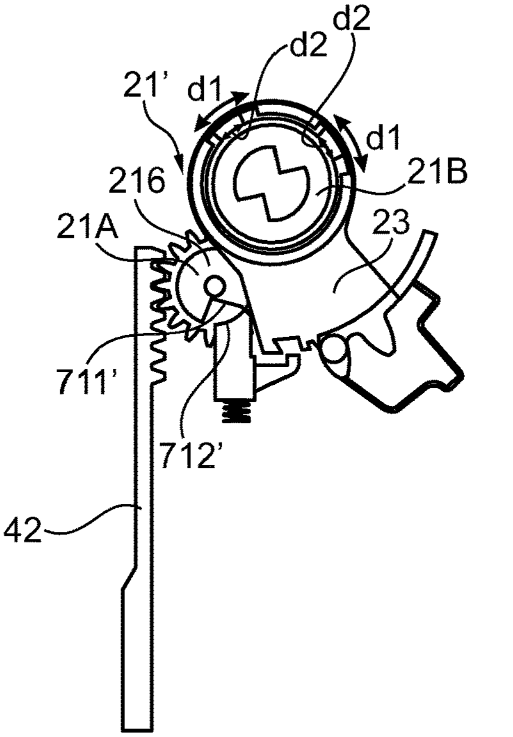

The invention will now be described in more detail with reference to the appended drawings, wherein FIG. 1 discloses a catch mechanism according to a first embodiment of the first aspect of the invention in a locked state;

FIG. 2 discloses the catch mechanism of FIG. 1 at a first portion of the path of the control member;

FIG. 3 discloses the catch mechanism of FIG. 1 at a second portion of the path of the control member as the catch mechanism has reached an unlocked state;

FIG. 4 discloses the catch mechanism of FIG. 1 as the control member starts to move from the unlocked state towards the locked state;

FIG. 5 discloses the catch mechanism of FIG. 1 as the control member has moved the follower to extend a bolt for locking a door; and FIG. 6 discloses the catch mechanism of FIG. 1 as the control member has moved the catch to its locking position;

FIG. 7 discloses an enlarged view of a section of the catch mechanism of FIG. 1 showing the first connector and the second connector;

FIG. 8 discloses a catch mechanism according to a second embodiment of the first aspect of the invention in a locked state;

FIG. 9 discloses the catch mechanism of FIG. 8 at a first portion of the path of the control member;

FIG. 10 discloses the catch mechanism of FIG. 8 at a second portion of the path of the control member as the catch mechanism has reached an unlocked state;

FIG. 11 discloses the catch mechanism of FIG. 8 as the control member starts to move from the unlocked state towards the locked state;

FIG. 12 discloses the catch mechanism of FIG. 1 as the control member has moved the follower to extend the bolt for locking the door; and FIG. 13 discloses the catch mechanism of FIG. 1 as the control member has moved the catch to its locking position;

FIG. 14 discloses the catch mechanism of FIG. 8 seen from outside an inner housing;

FIG. 15 discloses a catch mechanism according to a second aspect of the present invention in a locked state;

FIG. 16 discloses the catch mechanism of FIG. 15 after a first part of a rotary movement where the catch is moved into the open position;

FIG. 17 discloses the catch mechanism of FIG. 15 after a second part of a rotary movement where the follower is moved so that the catch mechanism is in the unlocked state;

FIG. 18 discloses the catch mechanism of FIG. 15 from behind to show the first connector and second connector in the locked state of FIG. 15; and FIG. 19 discloses the catch mechanism of FIG. 15 from behind to show the first connector and second connector in the state of FIG. 16.

DETAILED DESCRIPTION

The term play as used herein is defined as a connection between a first component and a second components wherein one of the components comprises a protrusion that extends into an opening of the other component. The first component is able to move in relation to the second component and vice versa by the opening being larger than the protrusion, so that the opening and the protrusion can move in relation to each other without the protrusion contacting walls or edges of the opening. Thus, a play is created that fulfills a function of allowing one component to move in relation to the other.

The term diameter as used herein is defined as a distance across an object from one end to another. Where the object is solid the diameter is therefore a cross-sectional distance from one end of the object to the other end, and where the object is hollow such as an opening or a cavity the diameter is a distance from one end of the opening or cavity to the other end. It is especially to be noted that the term diameter is to be construed as encompassing various shapes and not limited to a circular or round shape.

FIG. 1-7 disclose a catch mechanism 10 according to a preferred embodiment of a first aspect of the present invention. The catch mechanism 10 forms part of a locking device 1 having a bolt 61, in this embodiment a hook bolt 61, for extending to lock a door and retracting into the locking device 1 to open the door. The hook bolt 61 is arranged on a bolt pivot 611 and comprises hook bolt connectors 612 for engaging with a follower connector 231 on a follower 23 that pivots the hook bolt 61 towards the extended or retracted position. In some embodiments, the hook bolt 61 may instead be a dead bolt or any other kind of bolt that is configured to protrude from and retract into the locking device 1. The follower 23 further comprises a blocking portion 235 that is in contact with the hook bolt 61 in the locked state so that pivoting of the hook bolt 61 is prevented.

The catch mechanism 10 itself comprises the follower 23 for operating the bolt 61 and a catch 22 for preventing the follower 23 from movement in the locked state. Further provided is a control member 21 that controls operation of both the catch 22 and the follower 23.

The control member 21 is controlled by a cylinder 31 into which a key can be inserted in an inner hollow 312 and rotated so that a movement is transferred to the control member 21 via a wheel 51 having teeth 511 that cooperate with cylinder teeth 311 and teeth of a rack 211 of the control member 21. Thus, a rotary movement of the cylinder 31 is transferred into a linear movement of the control member 21 in a first direction A to move the catch mechanism to the unlocked state or in a second direction B to move the catch mechanism to the locked state.

Alternatively, the control member 21 is instead controlled by a motor 42 that operates a cam 41 having a rack 411 that is configured to cooperate with the teeth 511 of the wheel 51 for transferring a linear movement of the cam 41 into a rotary movement of the wheel 51 and consequently into a linear movement of the control member 21.

These two ways of operating the control member 21 may be used interchangeably and have the same effect on the catch mechanism as will be described in detail further below.

The control member 21 is in this embodiment arranged to perform a linear movement in the locking device 1 but could alternatively perform a curved movement (see further below in connection with a second embodiment). The control member 21 is configured to move along a path having a first portion at which the control member 21 operates the catch 22 and a second portion at which the control member 21 operates the follower 23. The first portion of the path is a first portion of a movement in the first direction A.

A first connector 71 connects the control member 21 to the catch 22 and comprises a first contact surface 711 on the control member 21 and a second contact surface 712 on the catch 22.

The catch 22 is in this embodiment configured to rotate about a catch pivot 222 and has a hook 221 that is arranged to extend into a cavity 232 of the follower 23 in the locking position. Also provided is a spring 223 that acts on the catch 22 with a bias that urges the hook 221 into the cavity 232. In this embodiment the spring 223 is a compression spring, but alternatively a torsion spring or any other suitable spring could be used instead. Alternatively, the catch 22 could be configured to perform a linear or curved movement instead of a pivoting movement.

A second connector 81 connects the control member 21 to the follower 23 and comprises an opening 812 and a protrusion 811 that extends into the opening 812. In this embodiment, the opening 812 is provided in the follower 23 and the protrusion on the control member 21, but in other embodiments the opening could instead be provided in the control member 21 and the protrusion on the follower 23. The opening 811 has a first diameter d1 and the protrusion 812 has a second diameter d2 wherein the first diameter d1 is larger than second diameter d2. This creates a play where the protrusion 812 can move in the opening 811 without contacting edges of the opening 811, resulting in the control member 21 being able to move a small distance without also moving the follower 23.

The components of the catch mechanism 10, or at least the control member 21 and the catch 22 are in this embodiment held in an inner housing 11 in the locking device 1. This has the benefit that the control member 21 and the catch 22 are not accessible from outside the inner housing 11 so that anyone seeking to manipulate the catch mechanism 10 by trying to move the control member 21 or the catch 22 without having inserted the key into the cylinder 31 of having activated the motor 42 to move the cam 41 will be prevented from doing so. It is also advantageous that the catch 22 is provided on a side of the control member 21 that is opposite from the bolt 61 so that it is difficult to reach the catch 22 by an opening where the bolt 61 protrudes from the locking device 1. The inner housing 11 thus provides an additional safety by encasing the control member 21 and the catch 22.

As used herein, a locked state is defined as a position of components of the catch mechanism 10 where the catch 22 blocks the follower 23 from moving. In this position, the follower 23 is in a position where a bolt 61 operated by the follower 23 is in an extended position from the locking device 1. Conversely, an unlocked state is defined as a state where the catch 22 does not block the follower 23 and where the control member 21 has moved the follower 23 to a position where the follower has retracted the bolt 61 into the locking device 1.

An open position of the catch 22 is defined herein as a position where the catch does not block the follower. Conversely, a locking position of the catch 22 is defined as a position where the catch 22 blocks the follower 23 so that the follower 23 is not able to be moved.

The operation of the catch mechanism 10 from the locked state to the unlocked state and back again will now be described in more detail with reference to FIG. 1-7.

In FIG. 1, the catch mechanism 10 is in the locked state where the catch 22 blocks the follower 23 by the hook 221 protruding into the cavity 232. If a movement of the follower 23 is attempted in this state, the hook 221 will jam against a wall of the cavity 232 so that pivoting of the follower 23 is prevented. By the bias provided by the spring 223, the hook 221 is urged into the cavity 232 and cannot be released by any external force on the follower 23 or any attempted movement of the follower 23 in relation to the locking device 1 or to the catch mechanism 10.

In FIG. 2, the catch mechanism 10 has been activated by the turning of the key in the cylinder 31 or the movement of the cam 41 by the motor 42. In the first case, the cylinder 31 generates a rotation of the wheel 51 which in turn results in a linear movement of the control member 21 in the first direction A (see FIG. 5). In the second case, the motor 42 operating the cam 41 instead generates the rotation of the wheel 51 which in turn results in a linear movement of the control member 21 in the first direction A.

The control member 21 starts to move along a path in the first direction, and during a first portion of the path the first contact surface 711 of the first connector 71 abuts the second contact surface 712. In this embodiment, the first contact surface 711 is inclined in relation to the second contact surface 712 on the catch 22 by being arranged at a first angle α in relation to an axis that is parallel to or coinciding with the first direction A. The first angle α may be 5-85°, preferably 20-70° and more preferably 30-60°. Due to the inclined surface, the movement of the control member 21 along the first portion of the path pushes the second control surface 712 and thereby also the catch 22 itself in a direction that is perpendicular to the first direction A. The catch 22 therefore pivots on the catch pivot 222 against the bias provided by the spring 223 so that the hook 221 is pivoted away from the cavity 232 on the follower 23. At this first portion of the path, the protrusion 811 of the second connector 81 moves in the play provided in the opening 812 so that the control member 21 does not push against the follower 23. Alternatively, the inclined contact surface may be curved or be in any other inclined shape.

In FIG. 3, the control member 21 has moved further along the path in the first direction A. The second contact surface 712 of the first connector 71 abuts a side of the control member 21 and is urged towards the control member 21 by the spring 223. The protrusion 811 of the second connector 81 has contacted the edge of the opening 812 and has pushed against the follower 23 so that the follower 23 is pivoted in a clockwise direction. The follower 23 is arranged to pivot around the cylinder 31 but may alternatively be arranged on another pivot or may instead perform a linear movement.

The follower connectors 231 have interacted with the hook bolt connectors 612 to pivot the hook bolt 61 into the locking device 1. Thus, FIG. 3 shows the unlocked state where the control member 21 is at an end of the path.

In FIG. 4, a movement towards the locked state has begun by the control member 21 moving in the second direction B so that the protrusion 811 reaches another end of the play provided in the opening 812.

FIG. 5 shows the control member 21 during movement in the second direction B, where the follower connectors 231 interact with the hook bolt connectors. The first contact surface 711 of the first connector 71 again abuts the second contact surface 712 but the hook 221 is held on a guide surface 233 on the follower to prevent it from pivoting towards the control member 21 before it reaches the cavity 232.

FIG. 6 shows the locked state again, where the control member 21 has moved to an end of the path in the second direction B and the hook 221 has been pivoted into the cavity 232 in order to block the follower 23. Thus, the catch 22 is in the locking position.

In FIG. 7, the guide surface 233 of the follower 23 is shown in more detail. The cavity 232 has a sidewall 234 that is angled away from the catch 22 so that a forced movement of the follower 23 would trap that hook 221 against the sidewall and prevent it from being forced out of the cavity 232. Thereby, any external force applied to pull the follower away by force will result in the catch 22 holding the follower 23 more firmly. The hook 221 itself may be curved to fit better into the cavity 232, and so that it can contact the angled sidewall 234. During normal operation the hook does not contact the sidewall 234. In some instances where the follower has been forced towards the unlocked state but is blocked by the hook 221 of the catch 22, the hook 221 does abut the sidewall 234. When the catch 22 is operated so that the hook 221 is removed from the cavity 232 there will be a frictional force between the hook 221 and the sidewall 234. By moving the catch 22 with sufficient force to counteract the frictional force, the hook 221 may still be removed from the cavity 232.

FIG. 7 also discloses the first angle α and the first diameter d1 and second diameter d2 of the second connector 81.

A second embodiment according to the first aspect of the invention will now be described in more detail with reference to FIG. 8-14. The second embodiment is similar to the first embodiment described above and will therefore be described mainly in those features that differ. Anything not specifically said to be different when comparing the second embodiment to the first will be assumed to be similar, and it is to be noted that features from the first and second embodiments may freely be combined unless such a combination is explicitly states as undesirable or disadvantageous. The same or very similar components are denoted by the same reference numerals.

The catch mechanism 10' is a mechanical catch mechanism that is operated by inserting a key into a cylinder 31 and rotating the key to generate a rotary motion that is transferred to the control member 21 for operating the catch mechanism. The cylinder 31 comprises an inner hollow 313 that is configured to be rotated 360°, and that has a cylinder protrusion 314 for engaging a control member protrusion 212 on the control member 21. In this embodiment, the control member 21 is configured to perform an arcuate movement and there is a control member bias 213 in the form of a torsion spring that serves to hold the control member 21 in its end positions, i.e. in its locked position and in its unlocked position. The catch 22 is biased by a spring 223 that in this embodiment is in the form of a torsion spring.

The first connector and second connector 71, 81 are similar to those of the preferred embodiment and will not be described in detail.

In FIG. 8, the catch mechanism 10' is in the locked state as described above. FIG. 9 shows a rotation of the cylinder 31 where the cylinder protrusion 314 has been moved in a clockwise direction and contacts the control member protrusion 212 so that the control member 21 has moved the first portion of the path that in this embodiment is a curved path. The catch 22 is in the open position by the first connector 71 acting to move the catch 22 against the bias from the spring 223, and in the second connector 81 the protrusion 811 has moved in the play provided in the opening 812.

FIG. 10 shows the catch mechanism 10' in the unlocked state with the control member 21 at the end of the path and where the follower 23 has retracted the bolt 61 into the locking device 1. The cylinder 31 has been rotated to a neutral position where the cylinder protrusion 314 points upwards and does not contact the control member protrusion 212. By the control member protrusion 212 and the control member 21 performing a curved rather than a linear movement, the cylinder protrusion 314 is able to rotate a full revolution with the cylinder 31 and not be hindered by the control member protrusion 212 blocking the cylinder protrusion 314 in the end position of the control member 21.

In FIG. 11, a movement towards the locked state has begun and the cylinder 31 is rotated counterclockwise so that the cylinder protrusion 314 contacts the control member protrusion 212 and moves the control member 21 along the curved path in the second direction B. The protrusion 811 has moved along the play in the opening 812 and the catch 22 is held in the open position by the control member 21.

FIG. 12 shows a position where the cylinder 31 has been rotated further in the counterclockwise direction and the bolt has been extended by the follower 23. The hook 221 of the catch 22 rests against the guide surface 233 of the follower 23 in the same way as described with reference to the preferred embodiment.

FIG. 13 again shows the locked state, where the catch 22 has fallen into place against the follower 23 and the hook 221 extends into the cavity 232. The cylinder 314 is again in a neutral position with the cylinder cavity 314 pointing upwards.

FIG. 14 shows the catch mechanism 10' from outside the inner housing 11. Only the cylinder 31 and the follower connectors 231 of the follower 23 are visible and the follower connectors 231 protrude through an opening 111 in the inner housing 11 that is dimensioned to prevent access to the catch mechanism 10' inside.

In the second embodiment, the catch 22 is not pivotable but instead performs a linear movement.

The catch mechanism 10" according to the second aspect of the invention will now be described in more detail with reference to FIG. 15-19. Many components are similar to those of the first aspect and will not be described in detail again. Any components with a similar appearance and/or function are denoted by the same reference numerals, and it is to be noted that any features of the second aspect can be combined with the catch mechanism according to the first aspect and vice versa, unless such a combination is explicitly stated as undesirable.

Thus, the catch mechanism 10" comprises a follower 23 and a catch 22 that acts to block the follower 23 in the locked state, but the main difference compared to the first aspect of the invention is that the control member is replaced by a control mechanism 21' that has a first member 21A and a second member 21B. The first and second members 21A, 21B are rotatable and are operatively connected to each other by teeth 214 of the first member 21A engaging with teeth 215 of the second member 215 so that a rotation of either of the first or second member 21A, 21B will also result in a corresponding rotation of the other. The first member 21A is arranged on a first pivot 217 and the second member 21B is arranged on a cylinder 31.

The catch mechanism 10" is operated either by a cylinder 31' that may be connected to the second member 21B or be integrated with the second member 21B, or by a cam 41 that is driven by a motor 42.

The follower 23 is configured to interact with a bolt in the same way as for the catch mechanisms described above; the bolt itself is not shown in the Figures.

The catch 22 is pivotable about a catch pivot 222 and is biased by a spring 223 that strives to hold a hook 221 inside a cavity 232 on the follower. The interaction of the catch 22 with the follower 23 is similar to the catch mechanisms described above and will therefore not be described in detail again.

The catch mechanism 10" is mounted in an inner housing 11 and is generally provided in a locking device 1.

In FIG. 15, the catch mechanism 10" is in the locked state, with the catch 22 positioned to block the follower 23. In FIG. 16, the catch 22 is pushed to the open position during a first portion of rotary movement of the control mechanism 21' so that the follower 23 is released, and in FIG. 17 a second portion of rotary movement of the control mechanism 21' has been performed so that the follower 23 is pushed to an end position and the catch mechanism 10" is in the open state.

The operation of the control mechanism 21' will now be described with reference to FIG. 18-19 that show the catch mechanism 10" from behind with some components removed to more clearly show the control mechanism 21'. In this view, the catch 22 is arranged to perform a linear motion and this is an alternative of the pivoting catch 22 that is shown in the previous figures.

The first member 21A is in the form of a wheel with teeth 214 for interacting with a rack 411 of the cam 41. The wheel comprises a back portion 216 that comprises a first contact surface 711' that interacts with a second contact surface 712' of the catch 22 to form a first connector 71'. Similarly to the catch mechanisms of the first aspect of the invention, the first connector 71' comprises two contact surfaces of which one is angled so that a movement of the first member 21A of the control mechanism 21' will push the catch 22 against the bias from the spring 223 into the open position. The movement of the first member 21A is here a rotary movement in a clockwise direction.

The second member 21B of the control mechanism 21' is in teethed engagement with the first member 21A as mentioned above, and a second connector 81' is formed between the second member 21B and the follower 23 by providing at least one opening 812' on an inner circumference of the follower 23 arranged on the cylinder 31. The second member 21B is arranged inside that inner circumference and comprises at least one protrusion 811' that extends in a radial direction into the opening 812'. In this embodiment, there are two protrusions and two openings, but only one of each would also be possible and also more than two. Each of the openings 812' have a first diameter d1 and the protrusions 811' have a second diameter d2 that is smaller than the first diameter d1 so that a play is formed.

Thus, in the second embodiment one of the opening 812' and the protrusion 811' is arranged on the second member 21B and the other is arranged on the follower 23. The function and operation of the catch mechanism according to the second embodiment will be the same regardless of which of the opening 812' and the protrusion 811' is arranged on the second member 21B and which is arranged on the follower 23, as will be readily apparent to the skilled person.

In the locked state in FIG. 18, the catch 22 is in the blocking position and the protrusions 811' have not moved along the play in the openings 812' of the second connector 81'. In FIG. 19, as the first member 21A rotates in the clockwise direction, the catch 22 is pushed downwards to free the follower 23. At the same time, the second member 21B has rotated in the counterclockwise direction so that the protrusions 811' have moved along the play in the openings 812'. This allows for the catch 22 to be moved without also attempting to move the follower 23, as described above. Once the catch 22 has been moved and the protrusions 811' reach an edge of the openings 812', the second member 21B moves the follower 23 to operate the bolt during a second portion of rotary movement.

Apart from the configuration and operation of the control mechanism 21' where it differs from the control member 21 described above, the second aspect of the invention is similar to the first aspect and will not be described in more detail herein.

Thus, it is especially to be noted that features and variations of the invention disclosed in relation to one of the embodiments is also applicable to any other embodiment as long as it is not explicitly stated that such a feature or variation is not suitable or possible to use with other embodiments.

It is to be noted that features from the various embodiments described herein may freely be combined, unless it is explicitly stated that such a combination would be unsuitable.

The invention claimed is:

1. A locking device (1) comprising a hook bolt (61) arranged on a bolt pivot (611) and comprising hook bolt connectors (612); and a catch mechanism (10, 10') for blocking a bolt to prevent unauthorized opening of a door, comprising a follower (23) for operating the hook bolt (61) between a locked state in which the hook bolt is pivotally extended and an unlocked state in which the hook bolt is pivotally retracted, said follower (23) comprising follower connectors (231) pivotally engaging the hook bolt connectors (612) such that said hook bolt (61) and follower (23) are mounted to pivot in opposite directions from one another;

a catch (22) configured to only block the follower (23) for preventing movement of the hook bolt in the locked state and not directly contact the hook bolt (61); and a control member (21) for operating the follower (23) and the catch (22);

wherein the catch mechanism (10, 10') further comprises a first connector (71) for connecting the control member (21) to the catch (22) and operating the catch, the first connector (71) comprising a first contact surface (711) on the control member and a second contact surface (712) on the catch (22), and a second connector (81) for connecting the control member (21) to the follower (23) and operating the follower (23) during movement of the control member (21) along a path, the second connector (81) comprises an opening (812) and a protrusion (811) extending into the opening (812), the opening (812) being larger than the protrusion (811) so that a play is formed in which the protrusion (811) is able to move without contacting a wall of the opening (812), and one of the opening (812) and the protrusion (811) is arranged on the control member (21) and the other is arranged on the follower (23), and the second connector (81) comprises the play so that the control member (21) at a first portion of the path operates only the catch (22) for moving from a locking position to an open position for unblocking the follower (23), and the control member (21) at a second portion of said path operates the follower (23) for moving the hook bolt (61) from the locked state to the unlocked state, and additionally comprising a cylinder (31) arranged to transfer movement to the control member (21), said cylinder (31) having teeth (311), a wheel (51) having teeth (511) arranged to cooperate with the cylinder teeth (311), and said control member (21) having rack (211) with teeth arranged to engage the teeth (511) of the wheel (51), such that rotary movement of the cylinder (31) is transferred into linear movement of the control member (21) to lock or unlock the catch mechanism (10).

2. The locking device (1) according to claim 1, further comprising an inner housing (11) in which at least the catch (22) and the control member (21) are arranged.

3. The locking device (1) according to claim 1, wherein the catch (22) is biased towards the follower (23), and the control member (21) operates the catch (22) by pushing it against the bias by means of the first connector (71).

4. The locking device (1) according to claim 3, wherein one of the first and second contact surfaces (711, 712) of the first connector (71) is a curved surface or an inclined surface that is preferably arranged at a first angle (a) to the path, and the catch (22) is biased towards the control member (21), so that a movement of the control member (21) along the path in a first direction (A) pushes the catch (22) against the bias from the locking position to the open position.

5. The locking device (1) according to claim 1, wherein the catch (22) comprises a hook (221) and the follower (23) comprises a cavity (232) for housing the hook (221) in the locking position, and the first connector (71) is configured to remove the hook (221) from the cavity (232) at the first portion of the path.

6. The locking device (1) according to claim 5, wherein the follower (23) comprises a guide surface (233) adjacent to the cavity (232) for guiding the hook (221) towards the cavity (232) when the control member (21) moves along the path in a second direction that is opposite to a first direction.

7. A locking device (1) comprising a hook bolt (61) arranged on a bolt pivot (611) and comprising hook bolt connectors (612); and a catch mechanism (10, 10') for blocking a bolt to prevent unauthorized opening of a door, comprising a follower (23) for operating the hook bolt (61) between a locked state in which the hook bolt is pivotally extended and an unlocked state in which the hook bolt is pivotally retracted, said follower (23) comprising follower connectors (231) pivotally engaging the hook bolt connectors (612) such that said hook bolt (61) and follower (23) are mounted to pivot in opposite directions from one another;

a catch (22) configured to only block the follower (23) for preventing movement of the hook bolt in the locked state and not directly contact the hook bolt (61); and a control member (21) for operating the follower (23) and the catch (22);

wherein the catch mechanism (10, 10') further comprises a first connector (71) for connecting the control member (21) to the catch (22) and operating the catch, the first connector (71) comprising a first contact surface (711) on the control member and a second contact surface (712) on the catch (22), and a second connector (81) for connecting the control member (21) to the follower (23) and operating the follower (23) during movement of the control member (21) along a path, the second connector (81) comprises an opening (812) and a protrusion (811) extending into the opening (812), the opening (812) being larger than the protrusion (811) so that a play is formed in which the protrusion (811) is able to move without contacting a wall of the opening (812), and one of the opening (812) and the protrusion (811) is arranged on the control member (21) and the other is arranged on the follower (23), and the second connector (81) comprises the play so that the control member (21) at a first portion of the path operates only the catch (22) for moving from a locking position to an open position for unblocking the follower (23), and the control member (21) at a second portion of said path operates the follower (23) for moving the hook bolt (61) from the locked state to the unlocked state, and additionally comprising a wheel (51) having teeth (511), a motor (42), and a cam (41) arranged to be operated by the motor (42) and having a rack (411) configured for cooperating with the teeth (511) of the wheel (51), such that linear movement of the cam (41) is transferred into rotary movement of the wheel (51) and consequently into linear movement of the control member (21).

* * * * *